(12) United States Patent  (10) Patent No.: US 8,113,149 B2
Quinn  (45) Date of Patent: Feb. 14, 2012

(54) CAT ENTERTAINMENT AND GROOMING DEVICE

(76) Inventor: Michele A. Quinn, Portland, ME (US)

( * ) Notice: Subject to any disclaimer, the term of this patent is extended or adjusted under 35 U.S.C. 154(b) by 11 days.

(21) Appl. No.: 12/799,166

(22) Filed: Apr. 20, 2010

(65) Prior Publication Data

US 2010/0263601 A1    Oct. 21, 2010

Related U.S. Application Data

(60) Provisional application No. 61/214,099, filed on Apr. 20, 2009.

(51) Int. Cl.
*A01K 13/00* (2006.01)
(52) U.S. Cl. ........................................ 119/622; 119/702
(58) Field of Classification Search .................. 119/622, 119/652, 702, 706, 708
See application file for complete search history.

(56) References Cited

U.S. PATENT DOCUMENTS

| | | | | |
|---|---|---|---|---|
| 4,177,761 A * | 12/1979 | Bellocchi, Jr. | | 119/482 |
| D265,139 S * | 6/1982 | Salvato | | D30/160 |
| D298,577 S * | 11/1988 | Faxon | | D30/108 |
| 4,807,569 A * | 2/1989 | Leopold | | 119/602 |
| 5,050,536 A * | 9/1991 | Baker | | 119/499 |
| 5,188,063 A * | 2/1993 | Evans | | 119/165 |
| 5,628,282 A * | 5/1997 | Udelle | | 119/609 |
| 5,842,440 A * | 12/1998 | Bell, Jr. | | 119/621 |
| 5,964,189 A * | 10/1999 | Northrop et al. | | 119/482 |
| 6,378,462 B1 * | 4/2002 | Gaves et al. | | 119/621 |
| 6,378,463 B1 * | 4/2002 | Simmons | | 119/707 |
| 7,469,660 B1 * | 12/2008 | Howden | | 119/702 |
| D584,863 S * | 1/2009 | Garry et al. | | D30/158 |
| 7,578,264 B2 * | 8/2009 | Guard | | 119/496 |
| 7,669,551 B2 * | 3/2010 | Lamstein | | 119/28.5 |
| D614,820 S * | 4/2010 | Kellogg et al. | | D30/160 |
| 2007/0283899 A1* | 12/2007 | Genitrini | | 119/708 |
| 2008/0178821 A1* | 7/2008 | Lamstein | | 119/496 |
| 2008/0196675 A1* | 8/2008 | Murrer | | 119/706 |
| 2008/0313788 A1* | 12/2008 | Yan | | 2/158 |
| 2009/0139461 A1* | 6/2009 | Ritchey | | 119/706 |
| 2010/0077961 A1* | 4/2010 | Lipscomb et al. | | 119/28.5 |
| 2010/0154719 A1* | 6/2010 | Kellogg et al. | | 119/706 |
| 2010/0319629 A1* | 12/2010 | Kellogg et al. | | 119/706 |

* cited by examiner

*Primary Examiner* — Yvonne R. Abbott
(74) *Attorney, Agent, or Firm* — Cherskov & Flaynik (57) ABSTRACT

A cat entertainment and grooming device 10 includes an enclosure 12 having a plurality of apertures 14 varying in dimension and configuration. The apertures 14 allow a cat access to an internal cavity 16 to allow the cat to play with pet toys 24 secured to internal portions of the cavity 16, or to sleep upon a heated cushion 62. The device 10 further includes a grooming member 30 centrally disposed upon an outer top wall 26 of a cover portion 38 of the enclosure 12. The grooming member 30 is rigidly positioned to remain stationary irrespective of the force imparted upon the grooming member 30 by a cat grooming itself by engaging the grooming member 30 while walking upon the outer top wall 26 of the enclosure 12.

20 Claims, 8 Drawing Sheets

CAT ENTERTAINMENT AND GROOMING DEVICE

This is based on U.S. Provisional Application No. 61/214,099, filed on Apr. 20, 2009.

BACKGROUND OF THE INVENTION

1. Field of the Invention

This invention relates to a device for entertainment and grooming cats, and more particularly, to a device that houses, entertains and comforts cats.

2. Background of the Prior Art

Cat entertainment and grooming devices are well known. The combination of the two functions in one enclosure such that the cat remains in or upon the enclosure is not well known. The problem with prior art devices is that they do not provide a plurality of toys movably connected to an internal cavity of the enclosure together with a grooming member secured to an outer top wall of the enclosure that forcibly engages and comforts the cat without injuring the cat. Prior art grooming members do not provide finger members placed with predetermined dimensions and configurations that result in a constant density that forcibly caresses the cat without injuring the cat.

A need exits for a simple enclosure with a very sophisticated grooming member to entertain and groom the cat without injuring the cat when the cat forcibly engages the grooming member.

SUMMARY OF THE INVENTION

It is an object of the present invention to overcome many of the disadvantages associated with prior art devices for entertaining and grooming cats.

A principal object of the present invention is to provide a device for housing and entertaining a cat. A feature of the device is an enclosure having multiple entrances with a toy supported from a spring that is attached to a bottom surface of a top wall of the enclosure. Another feature of the device is a grooming device secured to a top surface of the top wall such that the grooming device is vertically disposed. An advantage of the device is that the enclosure provides inner and outer portions to entertain the cat.

Another object of the present invention is to provide a grooming member to comfort the cat. A feature of the device is a predetermined quantity of frustoconically configured fingers to comfort and groom the cat when the cat engages the fingers. Another feature of the device is a predetermined arrangement of the fingers to provide uniform density across the grooming member to continually message the cat when the cat engages the fingers. Yet another feature of the device of the device is a planar tip portion of the fingers. An advantage of the device is that the fingers message but do not injure the cat as the cat engages the fingers.

Briefly, the invention provides a cat entertainment and grooming device comprising: an enclosure having at least one aperture to allow a cat inside said enclosure; a grooming member secured to a cover portion of said enclosure, said grooming member including a plurality of frustoconically configured fingers upon a surface; a support member secured to an inner top wall of said enclosure; and one of a plurality of cat toys removably secured to said support member.

Further, the invention provides a pet entertainment device comprising: an enclosure having a plurality of apertures that provide access to an internal cavity; a plurality of pet toys supported from various inner wall portions that form said cavity; and a receiving member disposed upon and secured to a cover portion of said enclosure, said receiving member detachably receiving one of a plurality of detachable grooming members, said enclosure and said detachable grooming member being dimensioned and configured to accommodate a predetermined range of cat sizes.

Also, the invention provides a pet grooming device comprising: an enclosure having a plurality of apertures that provide access to an internal cavity; a plurality of pet toys detachably supported from various inner wall portions that form said cavity; and a plurality of grooming members having varying configurations detachably secured to an outer top wall of a cover portion of said enclosure, said grooming members including frustoconical fingers numbering substantially about 168 upon a cylindrical rod that is eight inches long by one and one-half inches in diameter resulting in a one-quarter inch space between adjacent fingers in the same row or between fingers in adjacent rows, thereby providing the necessary finger density required to comfort a cat, said one-quarter inch separation between fingers in adjacent rows results from a first finger in adjacent rows being longitudinally offset substantially about one-quarter of an inch, thereby cooperating with a one-quarter inch diameter base portion of said fingers to provide a constant "stroking" action as the cat rubs against said fingers, said fingers numbering 14 in a row with 12 rows of said fingers being circumferentially arranged about said post, said fingers being substantially about three-fourths of an inch in length, one-fourth of an inch in diameter at a base portion, and one-sixteenth of an inch in diameter at said planar tip portion.

BRIEF DESCRIPTION OF THE DRAWINGS

These and other objects, advantages and novel features of the present invention, as well as details of an illustrative embodiment thereof, will be more fully understood from the following detailed description and attached drawings, wherein.

DESCRIPTION OF THE PREFERRED EMBODIMENT

Referring now to the drawings, a cat entertainment and grooming device is denoted as numeral 10. The device 10 includes an enclosure 12 having a plurality of apertures 14 varying in dimension and configuration. The apertures 14 allow a cat or other pet access to an internal cavity 16 formed via inner side and inner top walls 18 and 20, portions of the inner side and top walls 18 and 20 include a plurality of toy support members 22 that secure cooperating pet toys 24 such that a cat is enabled to engage and be entertained by the pet toys 24. The enclosure 12 has an open bottom 25, but may include a free standing or unattached bottom wall in the event a pet toy 24 is to be secured to a bottom portion of the enclosure 12. The enclosure further includes an outer top wall 26 having one or more receiving members 28 disposed upon the outer top wall 26. The receiving members 28 detachably receive cooperating detachable grooming members 30. The enclosure 12, apertures 14, pet toys 24 and grooming members 30 are dimensioned to accommodate a predetermined range of cat sizes.

The enclosure 12 may be fabricated from metal, plastic, wood, corrugated cardboard, recycled cardboard and combinations thereof. The enclosure 12 and apertures 14 can have any configuration and are dimensioned to cooperate with the size of the pet such that the pet can enter the enclosure 12 via any aperture 14, then proceed to play with any of the pet toys 24 secured to the enclosure 12. A protective edge cover 32 fabricated from carpet or similar padding may be disposed upon edge portions 34 of the apertures 14 to prevent injury to the pet as it enters the enclosure 12. A carpet 36 or similar soft, durable, washable cover is disposed upon the outer top wall 26 to provide comfort and a gripping surface for a pet and in particular for a cat. A rigid enclosure cover 38 forms the inner and outer top walls 20 and 26.

Figure 1:
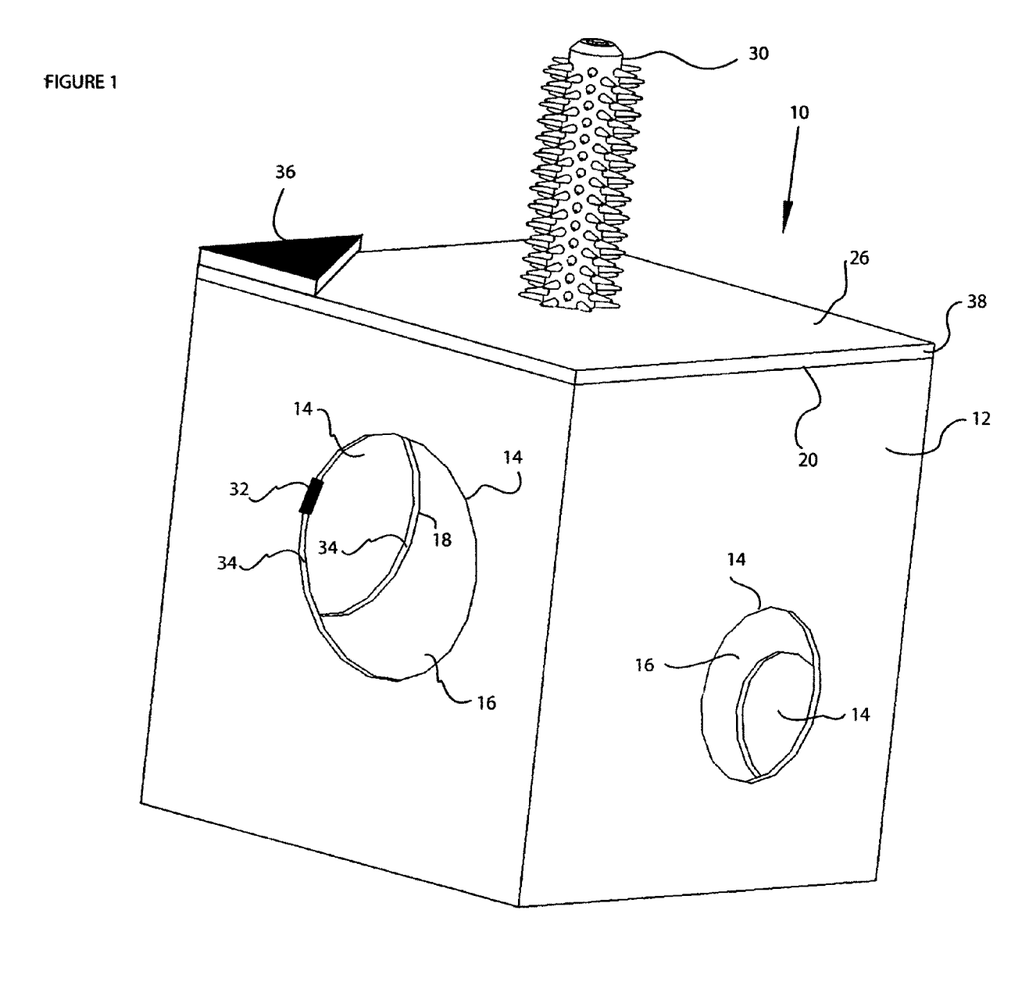
FIG. 1 is a top perspective view of a cat entertainment and grooming device in accordance with the present invention.
Figure 2:
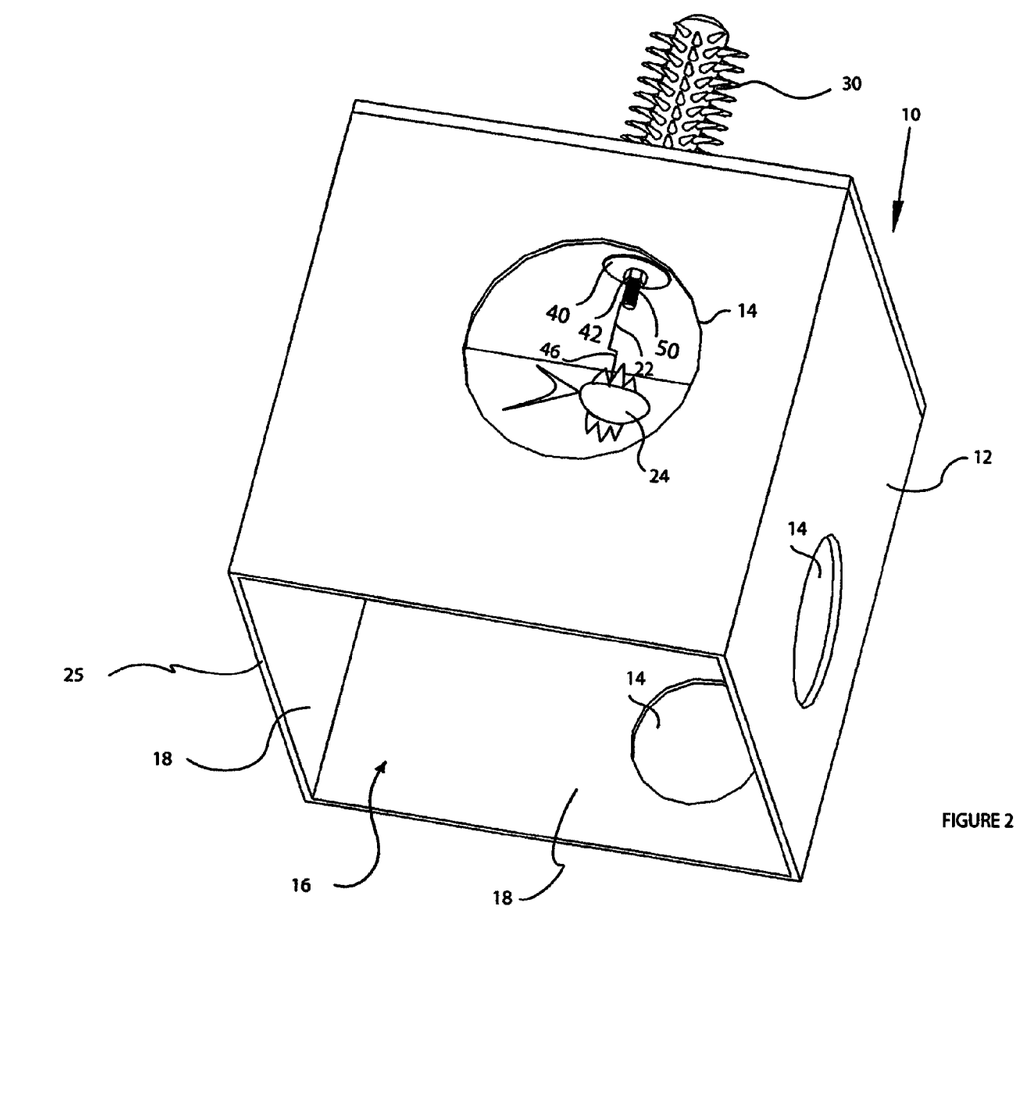
FIG. 2 is a bottom perspective view of the device of FIG. 1.
Figure 3:
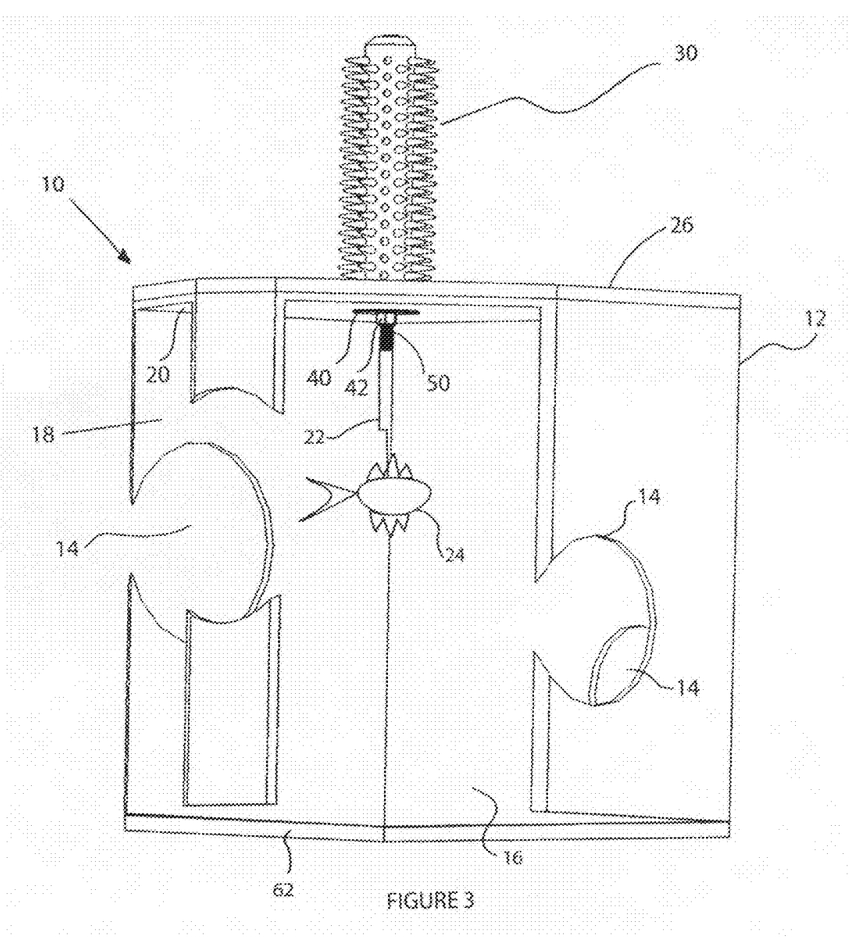
FIG. 3 is a front cut-away view of the device of FIG. 1.
Figure 3A:
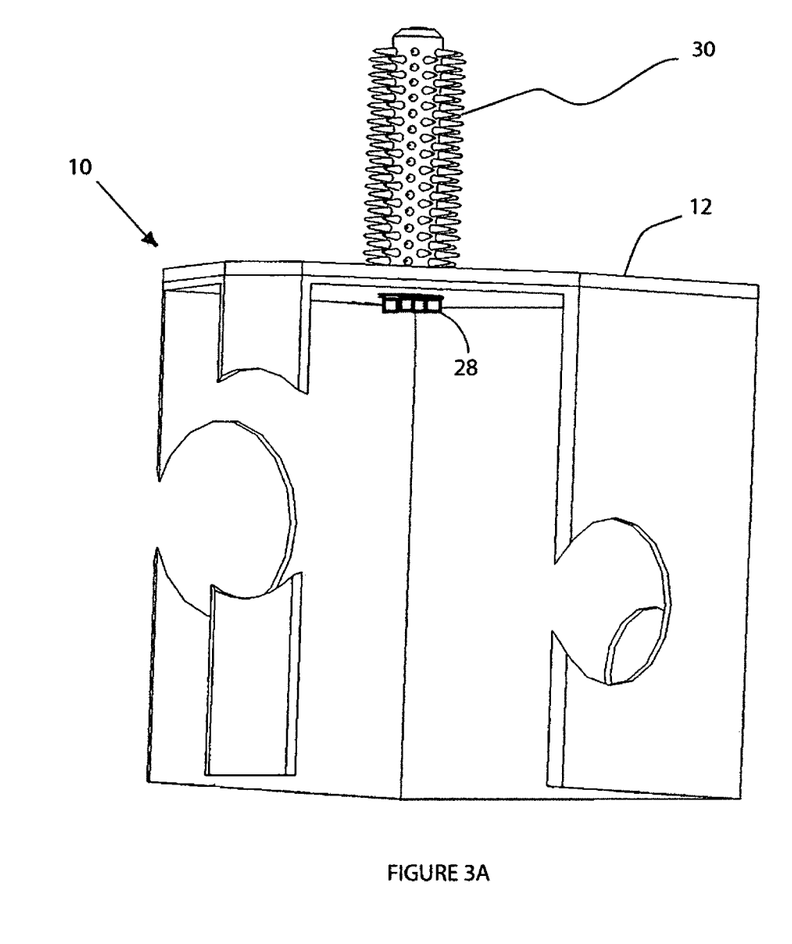
FIG. 3A is a front cut-away view of the device of FIG. 3, but with a receiving member 28 replacing the bolt 50 of FIG. 3 in accordance with the present invention.
Figure 4:
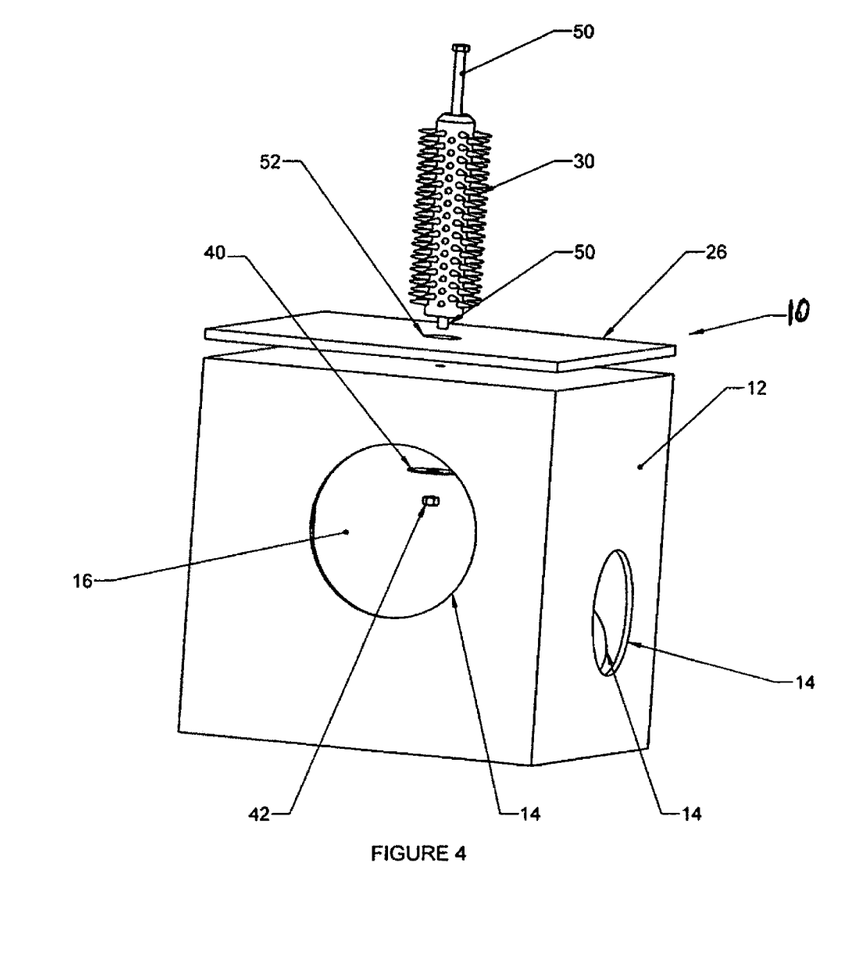
FIG. 4 is a front perspective, exploded view of the device of FIG. 1.
Figure 5:
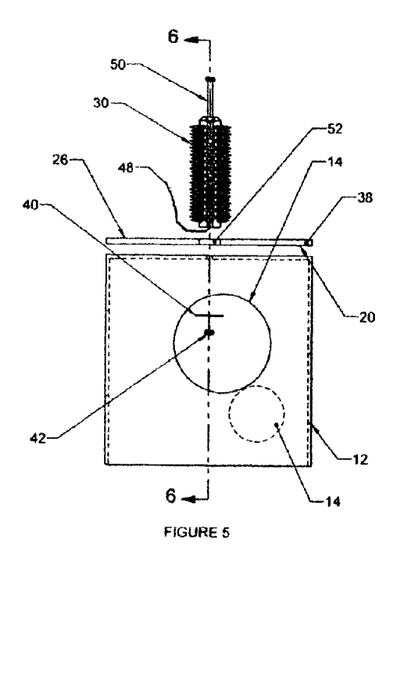
FIG. 5 is a front exploded, phantom view of the device of FIG. 1.
Figures 6, 8:
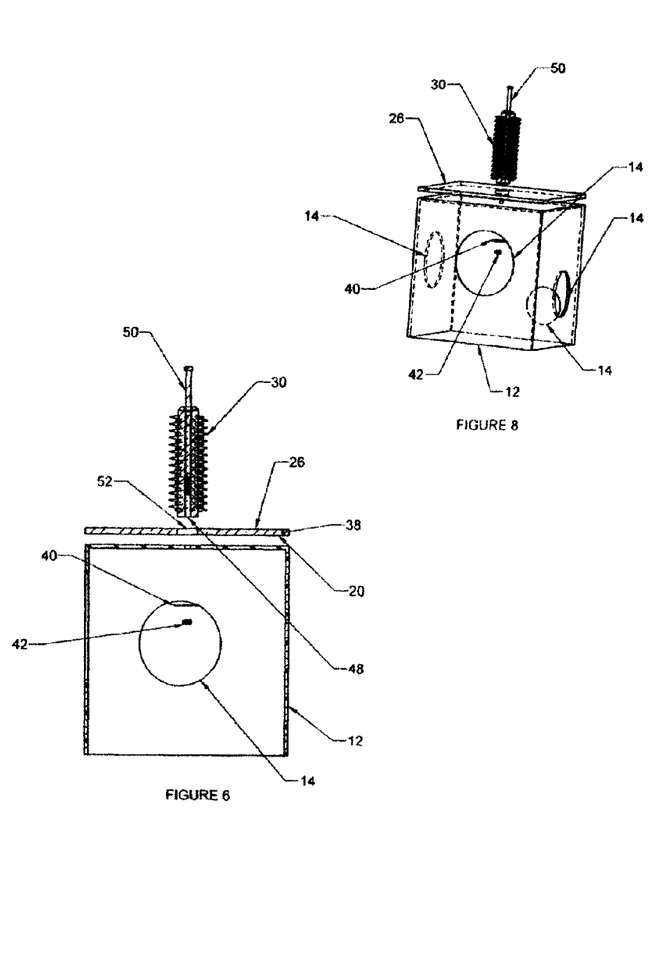
FIG. 6 is a section view taken along 6-6 in FIG. 5.
FIG. 8 is a front perspective, exploded, phantom view of the device of FIG. 1.
Figure 7:
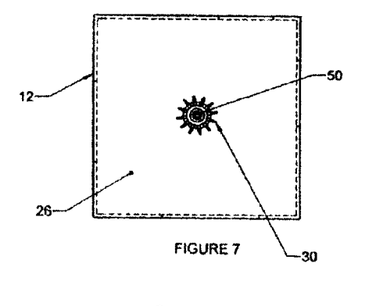
FIG. 7 is a top phantom view of the device of FIG. 1.
Figure 9:
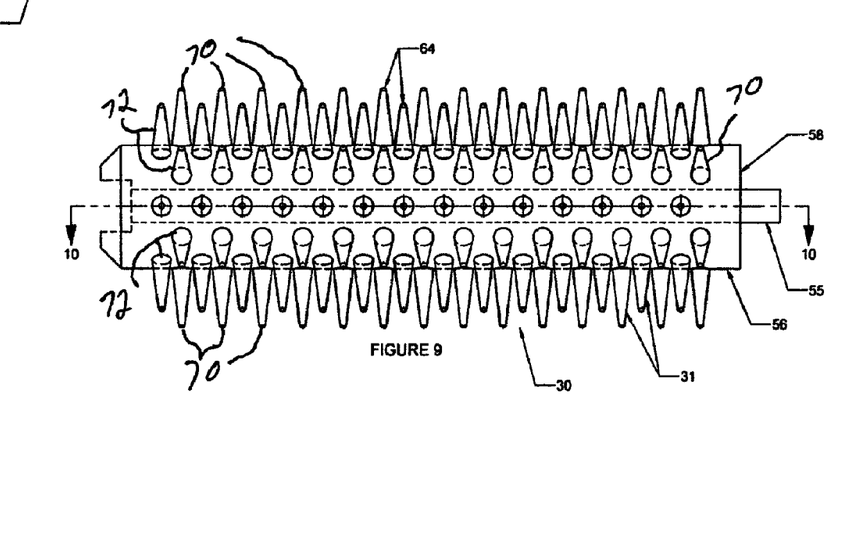
FIG. 9 is a front elevation view of a grooming member with a rod 55 extending therefrom which substitutes for the bolt 50 in the above drawings in accordance with the present invention.
Figures 10, 12:
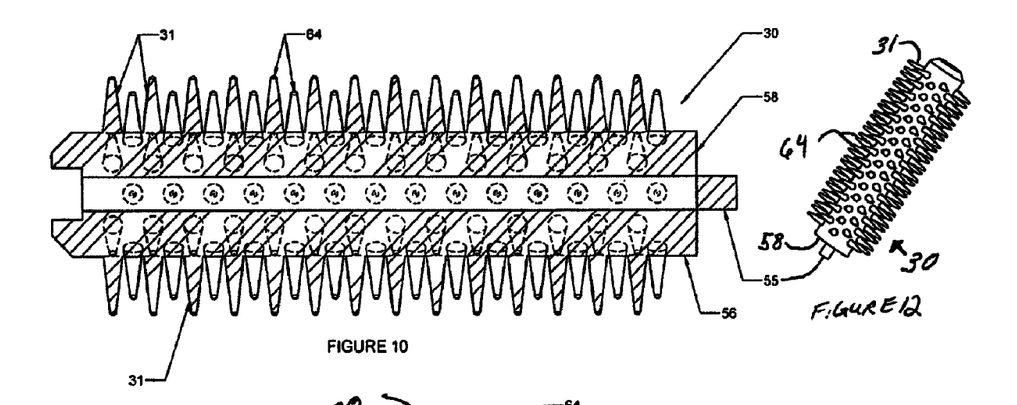
FIG. 10 is a sectional view taken along line 10-10 of FIG. 9.
FIG. 12 is a perspective view of the grooming member of FIG. 9.
Figure 11:
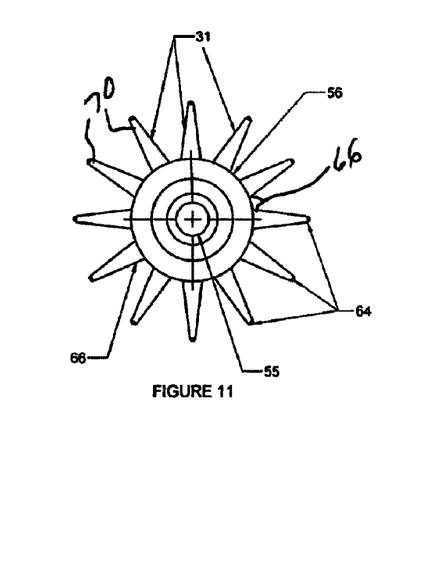
FIG. 11 is a side elevation view of the grooming member of FIG. 9.

The toy support members 22 may be rigid or deformable structures and include but are not limited to brackets, springs, posts, hooks and hangers. The toy support members 22 are attached to the center of the inner top wall 20 or to the outer top wall 26 via washer 40 and nut 42 assemblies oppositely disposed upon the inner and outer top walls 20 and 26. The pet toys 24 include a myriad of objects such as balls, bells, stuffed animals, feathers, yarn, figures, shiny objects, noise makers and a free-spinning or motorized toy. The toy support members 22 and the pet toys 24 cooperate to provide movement to the pet toys 24 after a pet has stopped engaging the toy 24, thereby providing continued entertainment for the pet. The toy 24, such as a ball 24, can be supported via a string 46 secured to a hook 22 configured support member 22 as depicted in FIG. 2.

The receiving members 28 for the grooming members 30 may be "sockets" with releasing mechanisms that receive cylindrically configured anchoring rods 55 integrally joined to a cylindrical post portion 56 of the grooming member 30. The sockets may be replaced by an extended anchoring rod 55 with threads that inserts through an aperture 52 in the enclosure cover 38. The threaded rod 55 has a diameter relatively smaller than the cylindrical post 56. The diameter of the rod 55 is sized to snugly insert through an aperture 52 in the cover 38. An end or bottom portion 58 of the post 56 includes a diameter that engages the outer top wall 26 of the cover 38 such that the post 56 and threaded rod 55 cooperate to vertically anchor the grooming member 30 upon the cover 38 when a washer 40 and nut 42 assembly is rotationally secured to the threaded rod 55 until the assembly engages the inner top wall 20 of the cover 38, thereby rigidly securing the grooming member 30 to the cover 38 to maintain the grooming member 30 in a stationary position irrespective of the force imparted upon the grooming member 30 by a cat grooming itself. The grooming member 30 is substantially centered on the cover 38 to allow a cat to walk upon the cover 38 while circling the grooming member 30. The grooming member 30 and cover 38 are dimensioned to cooperate with a selected range of cat sizes to allow one cat in the selected range to circumferentially walk upon the cover 38 while engaging the grooming member 30. The grooming members 30 include but are not limited to "brush" configured objects that include a relatively large quantity of flexible, frustoconically configured fingers 31 that promote grooming and massaging for a cat.

Referring to FIGS. 9-12, the cylindrical rod and post 55 and 56 of the grooming member 30 are substantially rigid and may be fabricated from a myriad of rigid materials to maintain the grooming member 30 in a substantially vertical position irrespective of the force imparted upon the grooming member 30 by a cat grooming itself. The post 56 includes a longitudinal dimension that is relatively longer than the height of the largest cat expected to engage the grooming members 30. The preferred longitudinal dimension for the post 56 is substantially about eight inches with a corresponding diameter measuring substantially about one and one-half inches. The fingers 31 may be fabricated from a relatively deformable material such as Nitrile rubber, silicone rubber or Santoprene Plastic, or similar material that is easy to clean with mild soap and water, and that resists chipping, cracking and wear.

Figure 13:
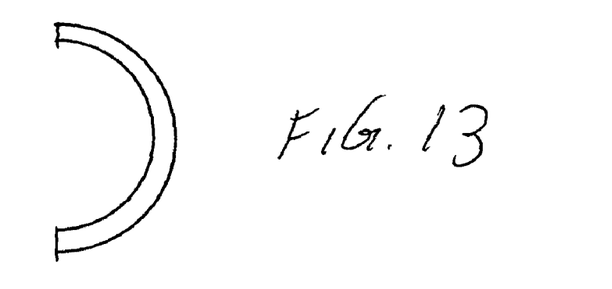
FIG. 13 is a front elevation view of an arcuate alternative post configuration in accordance with the present invention.
Figure 14:
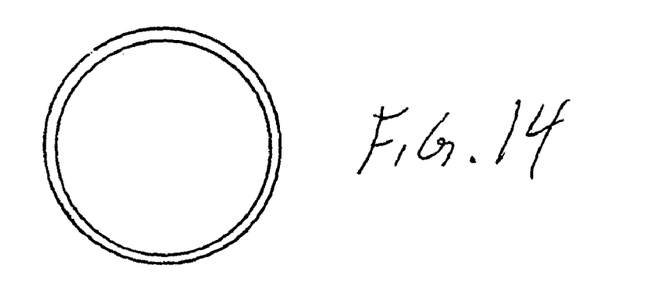
FIG. 14 is a front elevation view of a circular alternative post configuration in accordance with the present invention.
Figure 15:
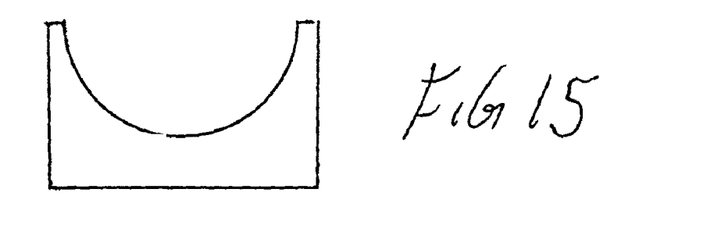
FIG. 15 is a front elevation view of a saddle alternative post configuration in accordance with the present invention.

The fingers 31 are equally spaced apart upon the cylindrical surface of the post 56, and the axes of the fingers 31 are radially disposed to intersect the axis of the post 56 such that substantially planar tip portions 64 of the fingers 31 are engaged by a cat thereby providing more grooming comfort for the cat. The frustoconical fingers 31 number substantially about 168 upon a cylindrical rod 56 that is eight inches long by one and one-half inches in diameter resulting in a one-quarter inch space between adjacent fingers 31 in the same row 70 or between fingers 31 in adjacent rows 70, thereby providing the necessary finger density 31 required to comfort a cat. The one-quarter inch separation between fingers 31 in adjacent rows 70 results from the first finger 72 in adjacent rows 70 being longitudinally offset substantially about one-quarter of an inch, thereby cooperating with the one-quarter inch diameter base portion 66 of the fingers 31 to provide a constant "stroking" action as the cat rubs against the fingers 31. The fingers 31 number 14 in a row with 12 rows 70 circumferentially arranged about the post 56. The fingers 31 are substantially about three-fourths of an inch in length, one-fourth of an inch in diameter at a base portion 66, and one-sixteenth of an inch in diameter at the planar tip portion 64. Although the post 56 is depicted as cylindrical, a myriad of configurations may be utilized, including but not limited to arcuate (FIG. 13), circular (FIG. 14) and saddle shaped (FIG. 15) with the same sized fingers 31 and finger 31 density as detailed above.

In place of the anchoring rod 55, the grooming members 30 may include an axial aperture 48 that facilitates the insertion of a bolt 50 through a member 30 and through an aperture 52 in the cover member 38, thereby allowing the bolt 50 and grooming member 30 combination to be vertically and rigidly secured to the cover member 38 by a washer 40 and nut 42 assembly to maintain the grooming member stationary. Obviously, a socket type receiving member 28 enables a pet owner to quickly and easily replace grooming members 30 to accommodate the pet.

The pet is further "pampered" by a quiet motor-hum, fan or heart beat sound generated by a microchip (not depicted) that is placed inside a mat for cats to sleep upon inside the enclosure 12. A heating element 60 may be disposed under a cushion or mat 62 to heat the cushion or mat 62 disposed inside the enclosure 12. Alternatively, the cushion or mat 62 may be fabricated from a material that can be placed in a microwave oven, thereby providing a heated mat 62 without using batteries and wires which could injure the cat.

In operation, a cat entertainment and grooming device 10 is fabricated from an enclosure 12 with apertures 14 for a cat to access an internal cavity 16, and a grooming member 30 rigidly secured to a central portion of an outer top wall 26 of the enclosure 12. The device 10 entices the cat to enter the enclosure 12 and play with or otherwise be entertained by one or more pet toys 24 suspended from an inner top wall 20 of the enclosure 12. After growing tired of playing with the pet toy 24, the cat may sleep inside the enclosure upon a heated cushion or mat 62, or may exit the enclosure 12 and climb upon a carpeted outer top wall 26 of the enclosure; whereupon, the cat can circumferentially walk upon the carpeted outer top wall 26 while engaging the grooming member 30, thereby grooming the cat and providing the cat another entertainment member.

The foregoing description is for purposes of illustration only and is not intended to limit the scope of protection accorded this invention. The scope of protection is to be measured by the following claims, which should be interpreted as broadly as the inventive contribution permits.

The invention claimed is:

1. A cat entertainment and grooming device comprising:
   an enclosure having at least one aperture to allow a cat inside said enclosure;
   a grooming member secured to a cover portion of said enclosure, said grooming member including a plurality of frustoconically configured fingers upon a surface;
   a support member secured to an inner top wall of said enclosure; and
   one of a plurality of cat toys removably secured to said support member.

2. The device of claim 1 wherein said cover portion includes a carpet disposed thereupon.

3. The device of claim 1 wherein said enclosure includes a plurality of apertures.

4. The device of claim 3 wherein said apertures vary in dimension and configuration.

5. The device of claim 1 wherein a receiving member is secured to said enclosure cover, said receiving member ultimately receiving said grooming member, said grooming member including means for detachably securing said grooming member to said receiving member, said enclosure and said grooming member being dimensioned to accommodate a predetermined range of cat sizes.

6. The device of claim 1 wherein said receiving member includes a bolt for removable insertion into an aperture in said grooming member.

7. The device of claim 1 wherein said grooming member includes a post for removable insertion into a receiving member.

8. The device of claim 1 wherein said support member includes a hook configuration.

9. The device of claim 1 wherein said grooming member includes a cylindrical post having a threaded cylindrical rod integrally joined thereto, said rod having a diameter relatively smaller than said post and dimensioned to snugly insert through an aperture in said cover portion, an end portion of said post ultimately engages an outer top wall of said cover portion, said end portion of said post and said threaded rod cooperating to anchor said grooming member upon said cover portion of said enclosure when a washer and nut combination is rotationally secured to said threaded rod until engaging an inner top wall of said cover portion, thereby rigidly securing said grooming member to said cover portion to maintain said grooming member in a stationary position irrespective of the force imparted upon said grooming member by a cat grooming itself.

10. The grooming member of claim 9 wherein said cylindrical post includes said plurality of frustoconically configured deformable fingers integrally joined to said cylindrical post and extending therefrom such that the axes of said fingers are radially disposed to intersect the axis of said cylindrical post.

11. The frustoconically configured deformable fingers of claim 10 wherein said fingers are equally spaced apart upon a cylindrical surface of said post, and the axes of said fingers are radially disposed to intersect the axis of said post such that substantially planar tip portions of said fingers are engaged by a cat thereby providing more grooming comfort for the cat, said fingers numbering substantially about 168 upon said rod, thereby providing the required finger density to comfort the cat.

12. The device of claim 1 wherein said enclosure includes a plurality of side walls arranged to configure one of a plurality of configurations that support said cover.

13. The device of claim 1 wherein said one of a plurality of cat toys removably secured to said support member includes a preselected sound generator.

14. The device of claim 1 wherein said pet toys include balls, bells, stuffed animals, feathers, yarn, figures, shiny objects, noise makers, free-spinning toys, motorized toys and combinations thereof.

15. A pet entertainment device comprising:
   an enclosure having a plurality of apertures that provide access to an internal cavity;
   a plurality of pet toys supported from various inner wall portions that form said cavity; and
   a receiving member disposed upon and secured to a cover portion of said enclosure, said receiving member detachably receiving one of a plurality of detachable grooming members, said enclosure and said detachable grooming member being dimensioned and configured to accommodate a predetermined range of cat sizes.

16. The device of claim 15 wherein all walls that form said enclosure are arranged in a selected one of a plurality of configurations.

17. The device of claim 15 wherein said plurality of pet toys are supported from said various inner wall portions by springs thereby allowing movement of said pet toys when engaged by a pet.

18. The device of claim 15 wherein a heated cushion is disposed inside said enclosure.

19. The device of claim 15 wherein said pet toys generate sound when engaged by a pet.

20. A pet grooming device comprising:
   an enclosure having a plurality of apertures that provide access to an internal cavity;
   a plurality of pet toys detachably supported from various inner wall portions that form said cavity; and
   a plurality of grooming members having varying configurations detachably secured to an outer top wall of a cover portion of said enclosure, said grooming members including frustoconical fingers numbering substantially about 168 upon a cylindrical rod that is eight inches long by one and one-half inches in diameter resulting in a one-quarter inch space between adjacent fingers in the same row or between fingers in adjacent rows, thereby providing the necessary finger density required to comfort a cat, said one-quarter inch separation between fingers in adjacent rows results from a first finger in adjacent rows being longitudinally offset substantially about one-quarter of an inch, thereby cooperating with a one-quarter inch diameter base portion of said fingers to provide a constant "stroking" action as the cat rubs against said fingers, said fingers numbering 14 in a row with 12 rows of said fingers being circumferentially arranged about said post, said fingers being substantially about three-fourths of an inch in length, one-fourth of an inch in diameter at a base portion, and one-sixteenth of an inch in diameter at said planar tip portion.

* * * * *